United States Patent
Wang et al.

(10) Patent No.: US 11,050,530 B2
(45) Date of Patent: Jun. 29, 2021

(54) GENERATING WIRELESS REFERENCE SIGNALS IN A DIFFERENT DOMAIN FOR TRANSMISSION WITH A COLLAPSED TIME-FREQUENCY GRID

(71) Applicant: AT&T Intellectual Property I, L.P., Atlanta, GA (US)

(72) Inventors: Xiaoyi Wang, Austin, TX (US); Salam Akoum, Austin, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/455,123

(22) Filed: Jun. 27, 2019

(65) Prior Publication Data

US 2020/0412500 A1 Dec. 31, 2020

(51) Int. Cl.
*H04L 27/26* (2006.01)
*H04L 5/00* (2006.01)

(52) U.S. Cl.
CPC ............ *H04L 5/0007* (2013.01); *H04L 5/005* (2013.01); *H04L 27/265* (2013.01); *H04L 27/2628* (2013.01)

(58) Field of Classification Search
CPC ............................ H04L 5/0007; H04L 27/265
See application file for complete search history.

(56) References Cited

U.S. PATENT DOCUMENTS

| | | |
|---|---|---|
| 4,644,562 A | 2/1987 | Kavehrad et al. |
| 6,018,317 A | 1/2000 | Dogan et al. |
| 6,654,429 B1 | 11/2003 | Li |
| 6,826,240 B1 | 11/2004 | Thomas et al. |
| 7,551,547 B2 | 6/2009 | Ghosh |
| 8,064,507 B1 | 11/2011 | Cheng et al. |
| 8,675,769 B1 | 3/2014 | Eliaz |

(Continued)

FOREIGN PATENT DOCUMENTS

| WO | 2017/044501 A1 | 3/2017 |
|---|---|---|
| WO | 2017/10666 A1 | 6/2017 |

OTHER PUBLICATIONS

Non-Final Office Action received for U.S. Appl. No. 16/419,809 dated Jun. 12, 2020, 14 pages.

(Continued)

*Primary Examiner* — Fahmida S Chowdhury
(74) *Attorney, Agent, or Firm* — Amin, Turocy & Watson, LLP

(57) ABSTRACT

According to an embodiment, a system can comprise a processor and a memory that can store executable instructions that, when executed by the processor, facilitate performance of operations. The operations can include generating a first signal in an initial domain and transforming the first signal into a first portion of a time-frequency grid of a time-frequency domain, resulting in a transformed first signal. The operations further include combining the transformed first signal with a second signal of a second portion of the time-frequency grid, resulting in a combined signal, and transmitting the combined signal to a user equipment device for a further transformation. The operations further include receiving a response signal from the user equipment device that was configured, based on the further transformed first signal.

20 Claims, 12 Drawing Sheets

(56) References Cited

U.S. PATENT DOCUMENTS

| | | |
|---|---|---|
| 9,686,702 B2 | 6/2017 | Beyme |
| 9,991,976 B2 | 6/2018 | Hu et al. |
| 10,171,214 B2 | 1/2019 | Wang et al. |
| 10,257,105 B2 | 4/2019 | Majmundar et al. |
| 10,530,504 B2 | 1/2020 | Fechtel |
| 10,547,397 B2 | 1/2020 | Chopra et al. |
| 10,651,912 B2 | 5/2020 | Wang et al. |
| 10,826,591 B1 | 11/2020 | Akoum et al. |
| 2005/0002461 A1 | 1/2005 | Giannakis et al. |
| 2006/0176941 A1 | 8/2006 | Nieto et al. |
| 2006/0269016 A1 | 11/2006 | Long et al. |
| 2009/0003134 A1 | 1/2009 | Nuttal et al. |
| 2009/0129493 A1 | 5/2009 | Zhang et al. |
| 2010/0111231 A1 | 5/2010 | Koorapaty et al. |
| 2010/0271259 A1 | 10/2010 | Stafforf et al. |
| 2011/0150052 A1 | 6/2011 | Erell et al. |
| 2011/0286507 A1 | 11/2011 | Yu et al. |
| 2012/0069887 A1 | 3/2012 | Park et al. |
| 2012/0082190 A1* | 4/2012 | Zhu .................... H04B 7/063 375/219 |
| 2012/0082274 A1 | 4/2012 | Bury |
| 2012/0114072 A1 | 5/2012 | Liu et al. |
| 2013/0114654 A1 | 5/2013 | Gomadam |
| 2013/0163537 A1* | 6/2013 | Anderson ......... H04W 72/1284 370/329 |
| 2013/0329772 A1 | 12/2013 | Wernersson et al. |
| 2014/0161154 A1 | 6/2014 | Hadani et al. |
| 2014/0169406 A1 | 6/2014 | Hadani et al. |
| 2014/0169437 A1 | 6/2014 | Hadani et al. |
| 2014/0177745 A1 | 6/2014 | Krishnamurthy et al. |
| 2014/0301492 A1 | 10/2014 | Xin et al. |
| 2015/0043439 A1 | 2/2015 | Sajadieh et al. |
| 2015/0078472 A1 | 3/2015 | Vook et al. |
| 2016/0119096 A1 | 4/2016 | Sun et al. |
| 2016/0119097 A1 | 4/2016 | Nam et al. |
| 2016/0156394 A1 | 6/2016 | Kim et al. |
| 2017/0012749 A1 | 1/2017 | Rakib et al. |
| 2017/0012810 A1 | 1/2017 | Rakib et al. |
| 2017/0013486 A1 | 1/2017 | Beyme |
| 2017/0033899 A1 | 2/2017 | Rakib et al. |
| 2017/0041061 A1 | 2/2017 | Lee et al. |
| 2017/0048029 A1 | 2/2017 | Lee et al. |
| 2017/0048810 A1* | 2/2017 | Sahlin ............... H04W 56/0045 |
| 2017/0064676 A1 | 3/2017 | Lee et al. |
| 2017/0093474 A1 | 3/2017 | Lee et al. |
| 2017/0338925 A1* | 11/2017 | Wei ..................... H04L 5/0048 |
| 2018/0109284 A1 | 4/2018 | Hadani et al. |
| 2018/0198497 A1 | 7/2018 | Wei et al. |
| 2018/0205481 A1 | 7/2018 | Shlomo et al. |
| 2018/0227159 A1 | 8/2018 | Rakib et al. |
| 2018/0262306 A1* | 9/2018 | Hadani ................ H04L 1/0023 |
| 2018/0309598 A1 | 10/2018 | Pena-Campos et al. |
| 2019/0013849 A1 | 1/2019 | Kobayashi |
| 2019/0013983 A1 | 1/2019 | Gao et al. |
| 2019/0044682 A1 | 2/2019 | Hebron et al. |
| 2019/0081836 A1 | 3/2019 | Hadani et al. |
| 2019/0089441 A1 | 3/2019 | Sivahumaran |
| 2019/0207661 A1 | 7/2019 | Froberg Olsson et al. |
| 2019/0238189 A1 | 8/2019 | Delfeld et al. |
| 2019/0245602 A1 | 8/2019 | Wang et al. |
| 2019/0268112 A1 | 8/2019 | Parra Michel et al. |
| 2019/0312623 A1 | 10/2019 | Park et al. |
| 2019/0326959 A1 | 10/2019 | Davydov et al. |
| 2020/0028617 A1 | 1/2020 | Landis et al. |
| 2020/0045569 A1 | 2/2020 | Seo et al. |
| 2020/0099434 A1 | 3/2020 | Wang et al. |
| 2020/0137774 A1 | 4/2020 | Molisch et al. |
| 2020/0177249 A1 | 6/2020 | Ramireddy et al. |
| 2020/0204220 A1* | 6/2020 | Zirwas ............... H04L 25/0226 |
| 2020/0235799 A1 | 7/2020 | Wang et al. |
| 2020/0259692 A1 | 8/2020 | Hadani et al. |
| 2020/0259697 A1 | 8/2020 | Delfeld et al. |
| 2020/0287672 A1 | 9/2020 | Namboodiri et al. |
| 2020/0374014 A1 | 11/2020 | Bendlin et al. |

OTHER PUBLICATIONS

Non-Final Office Action received for U.S. Appl. No. 16/419,432 dated May 14, 2020, 13 pages.

Notice of Allowance received for U.S. Appl. No. 16/419,432 dated Sep. 23, 2020, 35 pages.

Non-Final Office Action received for U.S. Appl. No. 16/419,561 dated Sep. 17, 2020, 20 pages.

International Search Report and Written Opinion received for PCT Application Serial No. PCT/US2020/030805 dated Aug. 11, 2020, 12 pages.

Notice of Allowance received for U.S. Appl. No. 16/419,561 dated Dec. 10, 2020, 35 pages.

Final Office Action received for U.S. Appl. No. 16/419,809 dated Nov. 12, 2020, 29 pages.

* cited by examiner

900

Symplectic Fourier Transform 950

$$r'(n,m) = \underbrace{\frac{1}{N_{S,\tau}N_{S,\nu}}\sum_{k=0}^{N_{S,\nu}-1}\sum_{l=0}^{N_{S,\tau}-1}}_{910} \underbrace{r(k,l)}_{920} e^{-j2\pi\left(\frac{ml}{N_{S,\tau}} - \frac{nk}{N_{S,\nu}}\right)}$$

FIG. 9

GENERATING WIRELESS REFERENCE SIGNALS IN A DIFFERENT DOMAIN FOR TRANSMISSION WITH A COLLAPSED TIME-FREQUENCY GRID

TECHNICAL FIELD

The subject application is related to wireless communication systems, and, for example, using reference signals to improve antenna connections, in a wireless network.

BACKGROUND

With the increase in the use of modern networks comes an increase in the number of antennas deployed. Technologies such as multiple input multiple output (MIMO) require even more antennas. In some circumstances, when connecting to one or more antennas, a user device receives a reference signal, specifying an identifier for the antenna and characteristics of the signal.

With the increase in antennas deployed, comes an increase in the number of reference signals transmitted in an area. In some circumstances, reference signals can be transformed so as to spread across the frequency-time domain, but this can lead to problematic impairment of other signals, in some circumstances.

BRIEF DESCRIPTION OF THE DRAWINGS

The technology described herein is illustrated by way of example and not limited in the accompanying figures in which like reference numerals indicate similar elements and in which:

FIG. 9 illustrates an example formula that can be used for one or more transformations described herein, in accordance with one or more embodiments.

DETAILED DESCRIPTION

Figure 1:
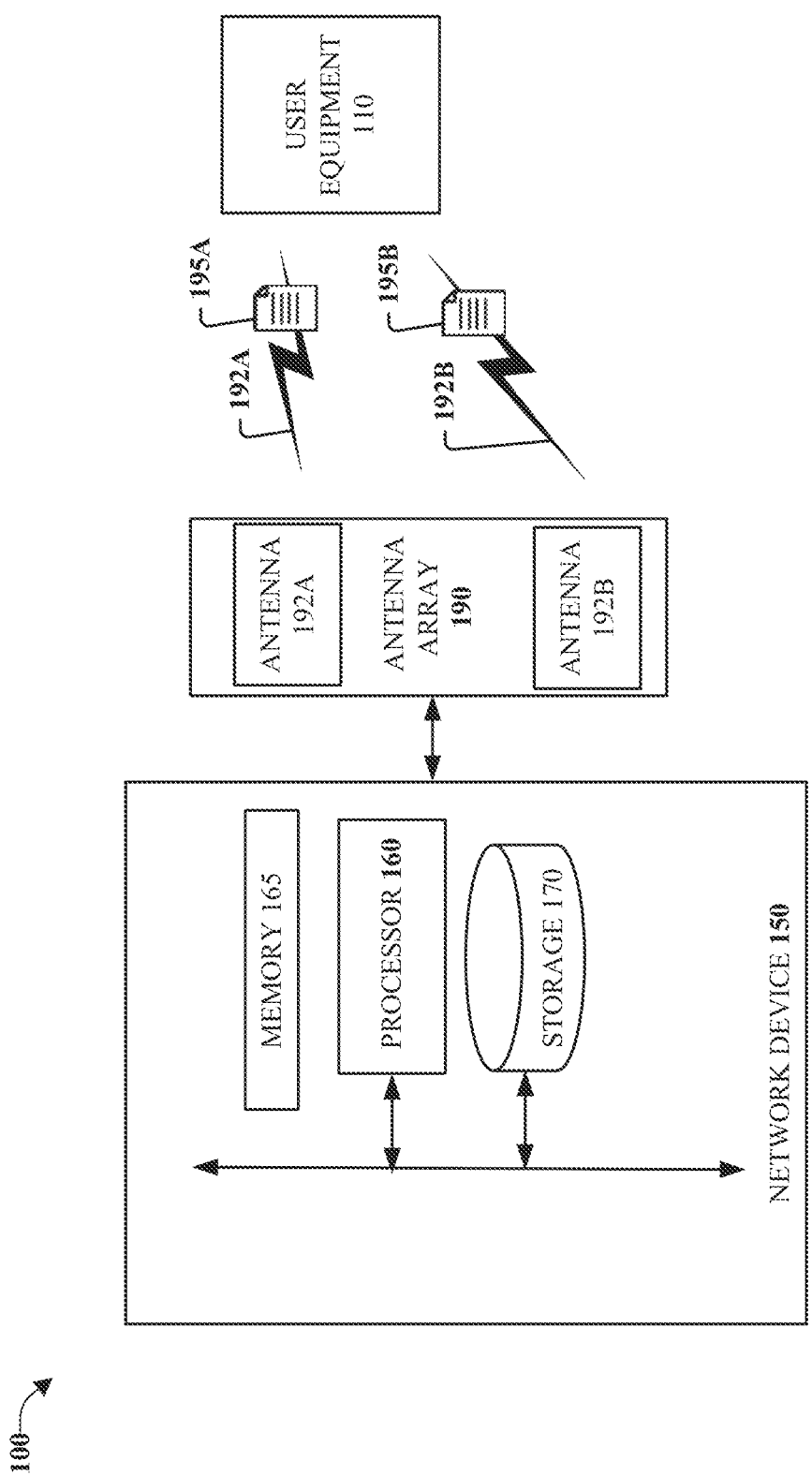
FIG. 1 illustrates a block diagram of an example, non-limiting system that includes a network device communicatively coupled to a user equipment via an antenna array that facilitates multiple wireless connections, in accordance with one or more embodiments.

Generally speaking, one or more embodiments described herein provide mechanisms and signaling to facilitate transforming wireless reference signals generated in a delay-Doppler domain into a collapsed portion of a time-frequency domain for combination with other signals and transmission to user equipment, in accordance with one or more embodiments.

In addition, one or more embodiments described herein can be directed towards a multi-connectivity framework that supports the operation of New Radio (NR, also termed 5G). As will be understood, one or more embodiments can allow an integration of V2X UEs with network assistance, by supporting control and mobility functionality on cellular links (e.g. Long Term Evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term integrated access backhaul (IAB) is used. In Release 16 of the 3rd Generation Partnership Project (3GPP) specification, an IAB framework based on fixed relays is standardized. This Release 16 IAB framework allows for a multi-hop network based on a hierarchical tree architecture. As described further below, in some embodiments, one or more of the non-limiting terms "relay node," "mobile relay node," "anchor node," and "mobile base station" can describe mobile relay nodes supporting a mobile IAB network. It should be appreciated that notwithstanding some descriptions herein referring to concepts of wireless base stations being "fixed," "stationary" or similar terms, and "mobile," "mobile," "nonfixed" or similar terms, these terms describing a capacity for movement are not limiting, e.g., in different embodiments, a mobile base station described herein can be fixed in position, and vice versa.

In some embodiments the non-limiting term user equipment (UE) is used. It can refer to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

Broadly speaking, one or more embodiments can improve the operation of transmitting wireless reference signals. By generating the reference signals in an initial domain (e.g., delay-Doppler), then transforming the reference signals into a frequency time domain for transmission, one or more embodiments can improve the transmission of the reference signals in ways including, reducing the overhead of the signals, and reducing the density of the signals.

FIG. 1 illustrates a block diagram of an example, non-limiting system 100 that includes network device 150 communicatively coupled to user equipment 110 via an antenna array 190 that facilitates multiple wireless signals 192A-B, in accordance with one or more embodiments. A non-limiting example of signals that can be transmitted via wireless signals 192A-B using approaches discussed herein are reference signals 195A-B.

According to multiple embodiments, network device 150 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer executable components 120 that can, when executed by processor 160, execute the components.

In some embodiments, memory 165 can comprise volatile memory (e.g., random access memory (RAM), static RAM (SRAM), dynamic RAM (DRAM), etc.) and/or non-volatile storage 170 (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1206 and FIG. 12. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1204 of FIG. 12. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1200 and FIG. 12. In one or more embodiments, such computer and/or computing-based elements can be used in connection with implementing one or more of the systems, devices, components, and/or computer-implemented operations shown and described in connection with FIG. 1 or other figures disclosed herein.

It should further be appreciated that, although several examples discussed herein relate to the combination of control signals (specifically channel state information reference signals (CSI-RS)) and data signals, the approaches discussed herein can apply to the transformation and combination of different types of wired and wireless signals that utilize frequency-time resources.

Figure 2:
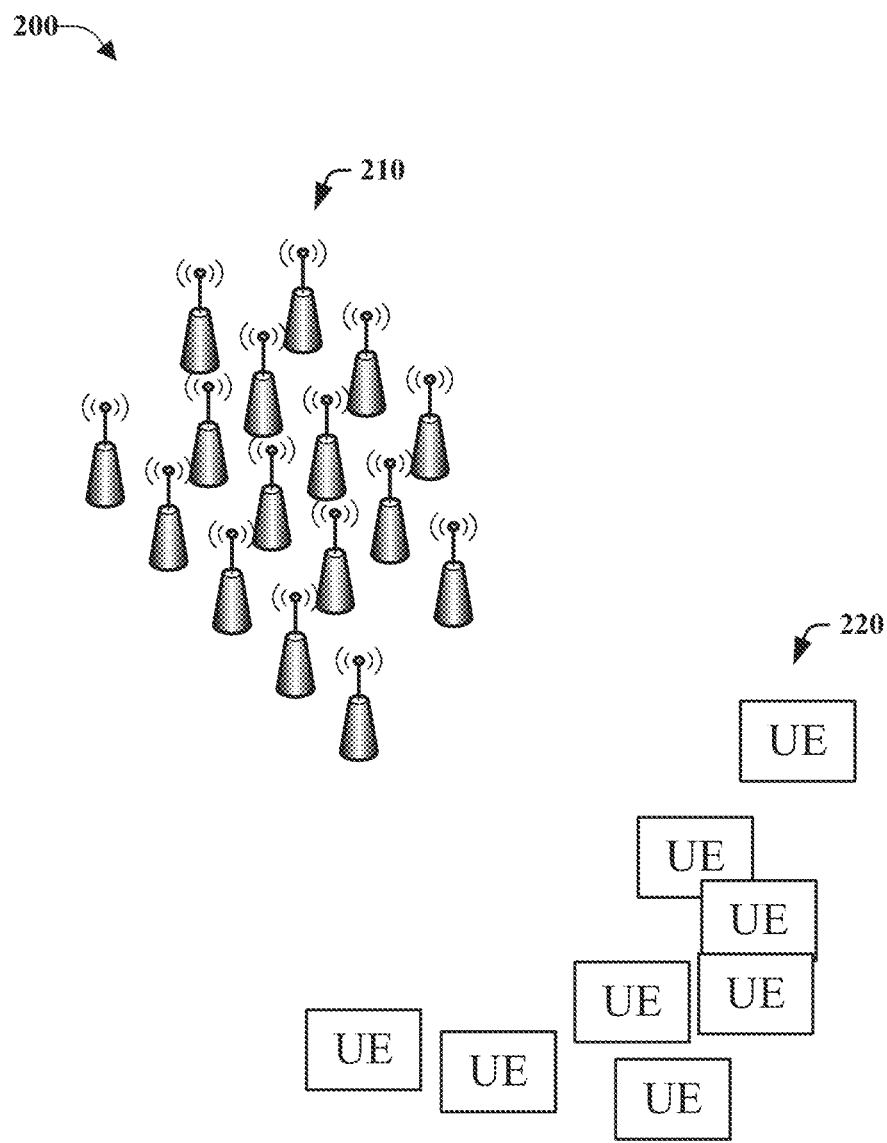
FIG. 2 illustrates an example wireless communication system showing multiple example antennas and multiple UEs, in accordance with one or more embodiments.

FIG. 2 illustrates an example wireless communication system 200 showing multiple example antennas 210 and multiple UEs 220, in accordance with one or more embodiments. For purposes of brevity, description of like elements and/or processes employed in other embodiments is omitted.

In one or more embodiments, in order for a UE to use MIMO, UE 110 generally must identify the number of antennas available, and the channel of each antenna 210 to be used. In some circumstances each antenna can broadcast a specific, known reference signal, that can be used by UEs 110 to both identify the antenna and assess channel state information (CSI).

As wireless connections have increased, the number of antennas, reference signals, and data have increased. In some implementations, data and reference signals can share the same available resources. One way to facilitate this sharing is by allocating resources using a time-frequency grid. Example grids are discussed with FIGS. 3-8 below to illustrate aspects of one or more embodiments.

Figure 3:
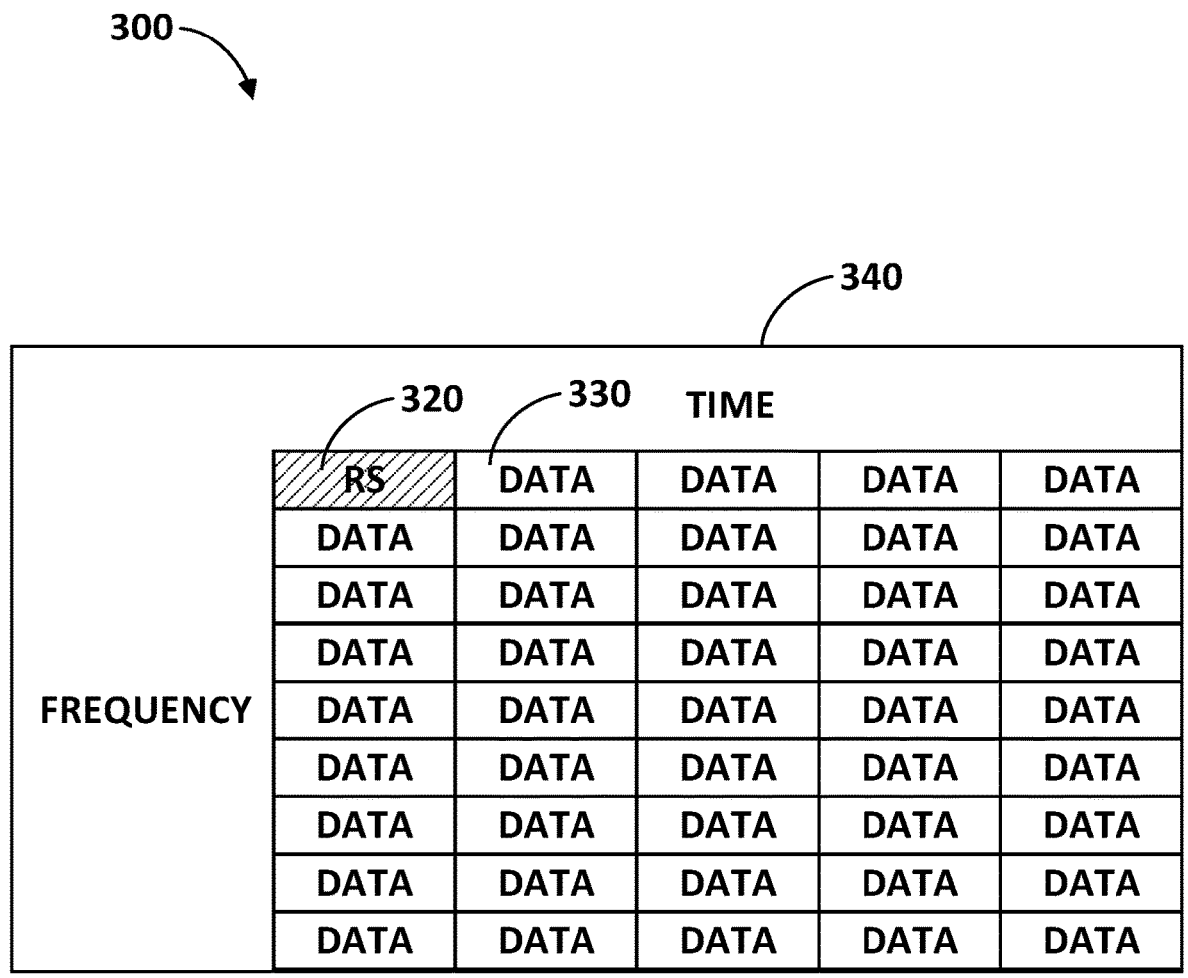
FIG. 3 illustrates a non-limiting, example time-frequency grid with resource elements (REs) scheduled to be used by resource signals (RS) and data signals (DATA), in accordance with one or more embodiments.

FIG. 3 illustrates a non-limiting, example 300 time-frequency grid 340 with resource elements (REs) scheduled to RS and data signals (DATA), in accordance with one or more embodiments. Example grid 340 is shown as smaller than typical grids used for scheduling, e.g., a typical grid is 12 by 14. For purposes of brevity, description of like elements and/or processes employed in other embodiments is omitted.

Time-frequency grid 340 includes grid boxes for REs allocated to RS 320 and DATA 330 signals. Although not shown, in some implementations, both RS and DATA signals can be allocated to the same RE, potentially causing interference with one or both of these signals. This sharing is also called non-orthogonal multiplexing. While data can be more resistant to interference (because of coding), when RS signals are degraded, CSI estimation accuracy can decrease. As described with FIGS. 4-7 below, one or more embodiments can combine transformed RS signals with orthogonal multiplexing of other signals to reduce this interference.

Figure 4:
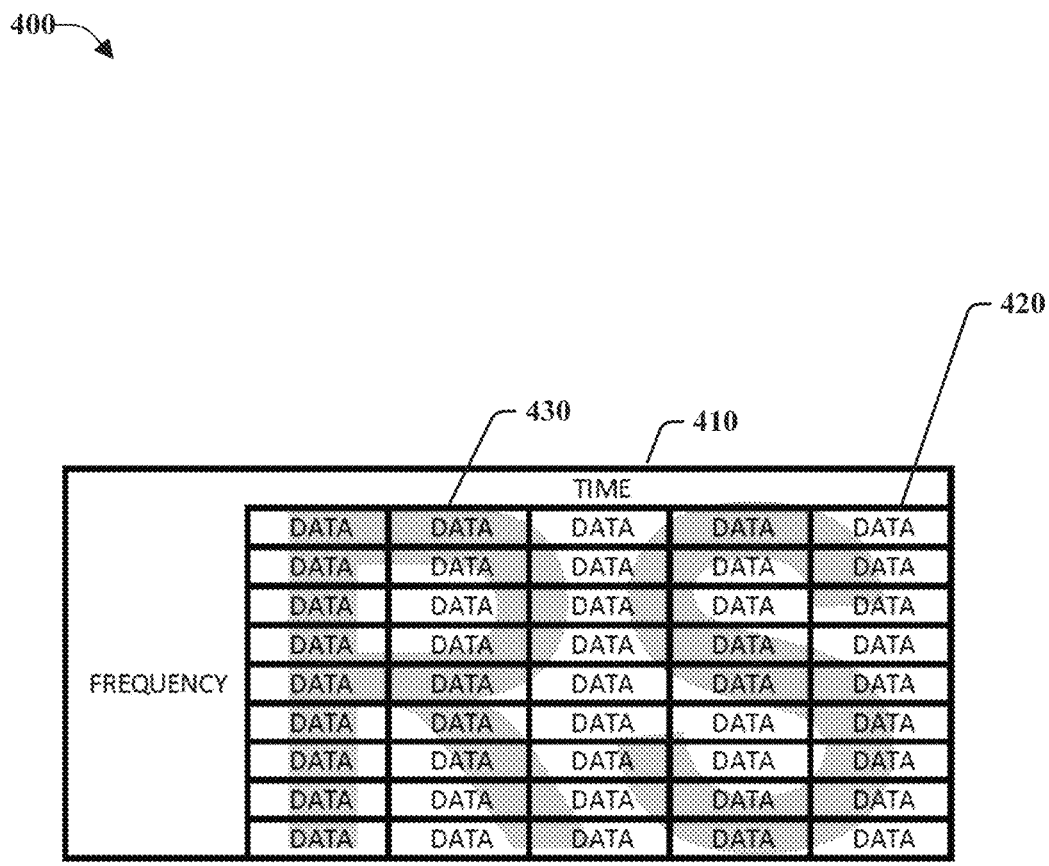
FIG. 4 depicts an example of a time-frequency grid that illustrates an approach that spreads the RS across the time-frequency domain to overlay data signals, in accordance with one or more embodiments.

FIG. 4 depicts an example of a time-frequency grid 410 that illustrates an approach that can spread the RS across the time-frequency domain to overlay data signals, in accordance with one or more embodiments. For purposes of brevity, description of like elements and/or processes employed in other embodiments is omitted.

In this approach, when a RS sequence is generated in delay-Doppler domain, each delay-Doppler sample can spread into all available time-frequency REs. This is a form of non-orthogonal multiplexing that can result in less interference for both RS and data signals because, as depicted at label 430, the RS is spread across the entire time-frequency grid, e.g., because in some circumstances the RS has less effect on individual REs and individual REs have less effect on the RS.

Another benefit that can occur with the spreading affect is an increase in the signal strength of the RS signal. In some embodiments, this increase in signal strength can further counter the increase the potential interference from DATA REs. It should be noted however that, because this can be a form of non-orthogonal multiplexing, interference between the signals is still a potential problem. As described with FIG. 5 below, one or more embodiments can modify the approach used to generate RS 430 so that this signal is generated to spread across a collapsed time-frequency grid, e.g., a portion of time-frequency grid less than the entire grid. Based on this, other signals can be allocated the remaining portion of the time-frequency grid, and interference can be further reduced.

Figure 5:
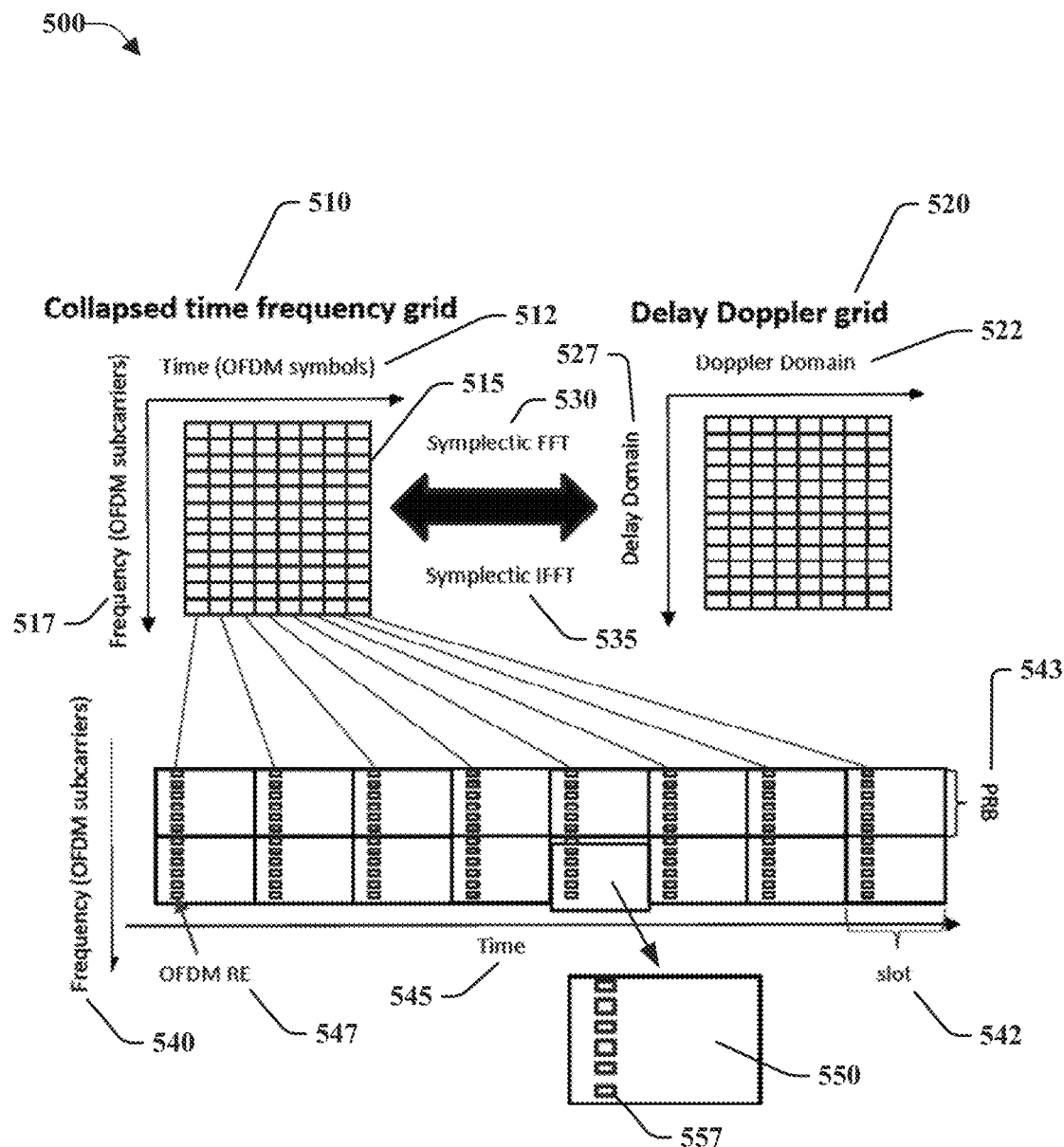
FIGS. 5-6 illustrate non-limiting examples of a process that can use transformations and collapsed time-frequency grid for the combined transmission of RS and data signals, according to one or more embodiments.
Figure 6:
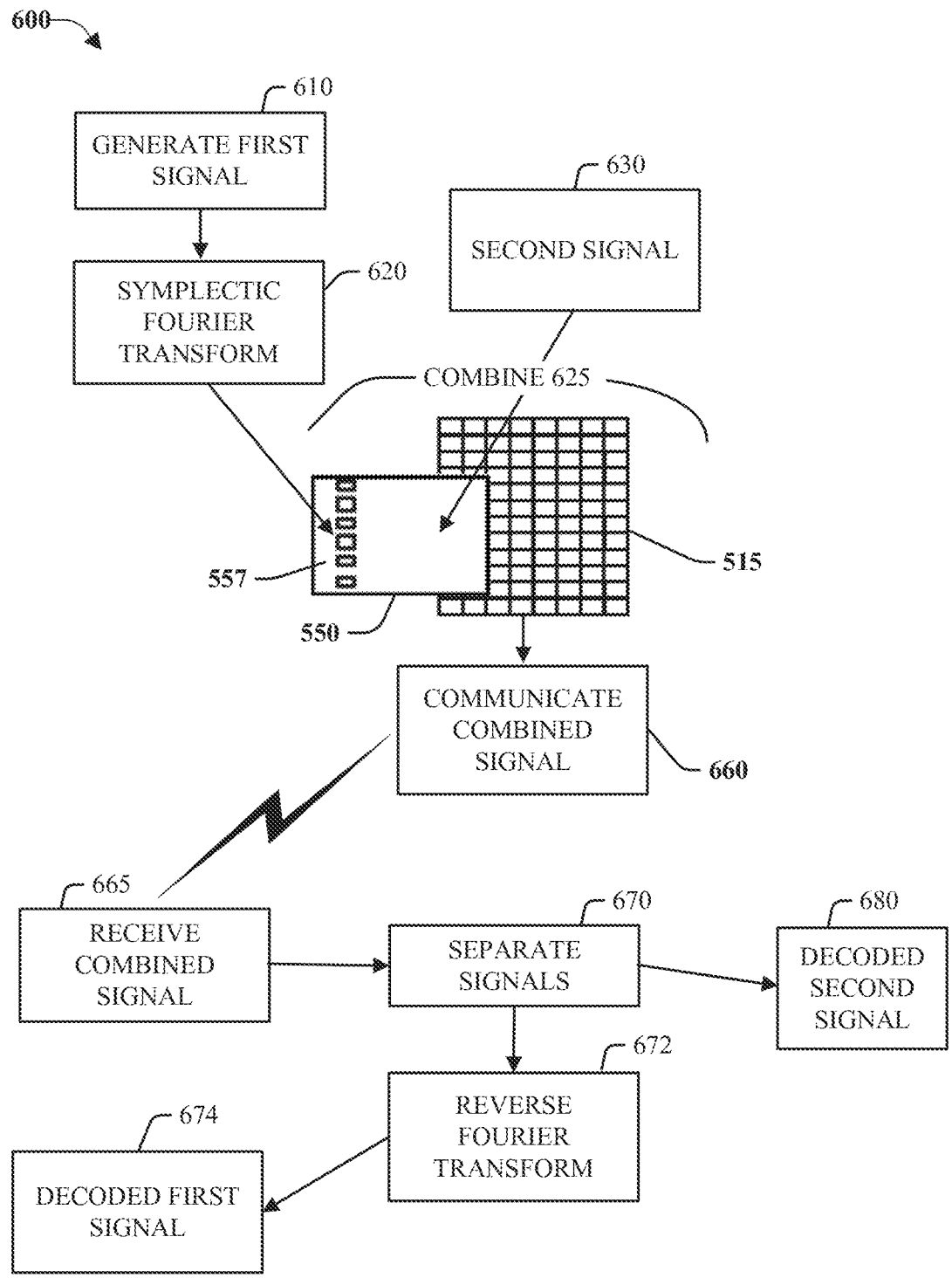

FIGS. 5-6 illustrate non-limiting examples of a process 600 that can use transformations 530-535 and collapsed time-frequency grid 510 for the combined transmission of RS and data signals, according to one or more embodiments. For purposes of brevity, description of like elements and/or processes employed in other embodiments is omitted.

At block 610, a first signal is generated, e.g., a reference signal such as a CSI-RS signal. In contrast to different approaches, one or more embodiments can generate the first signal in a domain different from the time-frequency domain. In an example, the first signal can be generated in an initial domain, e.g., the delay-Doppler domain, shown in delay-Doppler grid 520 as an intersection of delay domain 527 and doppler domain 522.

The generated reference signal can be transformed from the initial domain into another domain for scheduling and transmission, e.g., the time-frequency domain, shown in FIG. 5 as the intersection of the time domain 512 and the frequency domain 517. For example, as shown in block 620, In one or more embodiments, the transformation can be a symplectic Fourier transform that transforms the reference signal in the delay-Doppler domain into a transformed reference signal in the time-frequency domain. As an additional description, and the formula for this transformation is shown with FIG. 9 below. In one or more embodiments, as described with FIG. 4 above, this transition can c the spreading of the RS across the entire time-frequency REs, e.g., as depicted in FIG. 4, with RS 430 spanning time-frequency grid 410 overlaying data REs 420.

In an alternative embodiments to the approach described in FIG. 4, in one or more embodiments, the transformation can be limited so as to spread the RS across a portion of time-frequency grid 410 of FIG. 4. In an example approach, instead of being transformed into a signal spreading across the entire available time-frequency domain, the reference signal can be transformed into a collapsed time-frequency grid, e.g., a portion of the time-frequency grid that is less than (e.g., collapsed) the whole grid. In one or more embodiments, a second portion of the grid can include the remainder of the grid, or other smaller portion, different than the first portion. Thus, in these embodiments, the transformation described above is directed to the first portion of the time-frequency grid, while the second portion is not a target of the transformations.

Different approaches can be used by one or more embodiments to separate the time-frequency grid into the first and second portions. In one or more embodiments, as depicted in FIG. 5, the first portion can be a portion of the time-frequency grid that is orthogonal to the second portion of the time-frequency grid 515. Further, the collapsed time-frequency grid can be formed by following a subsampling pattern that is configurable according to a granularity requirement on a different time period or different subband. For example, in one or more embodiments, with a higher UE velocity, the time domain sampling rate used to generate the collapsed time-frequency grid, should be higher. Additional configurable options including being able to configure both the collapsed time-frequency grid, as well as the subsampling pattern is also configurable. In the example of FIG. 5 discussed above, the example subsampling pattern is regular, and with FIG. 7 below, and example is described with an irregular subsampling pattern (e.g., an irregular periodicity) used to generate the collapsed time-frequency grid for approaches described above.

As depicted in FIG. 5, physical resource blocks (PRBs) 543 can be divided into orthogonal subcarriers for each time slot 542. With respect to block 550, symbols of the transformed reference signal are depicted in an RE 557 portion of resource block 550, e.g., with another orthogonal portion (not shown) being available for orthogonal frequency division multiplexing (OFDM).

In one or more embodiments, based on the processes described above, the transformed first signal can be combined with second signal 630 by employing OFDM, with the RS spread across a first orthogonal subcarrier (and providing some of the benefits of RS 430 discussed above) and with the second signal being combined with other signals in the second orthogonal subcarrier, e.g., by frequency-time division multiplexing as depicted in FIG. 3 above. For example, considering time-frequency grid 515, PRB 550 can be separated in to orthogonal subcarrier RE 547, with RE 557 and other subcarriers of other PRBs being allocated to the first portion described above and an orthogonal portion allocated to one or more second signals 630, this resulting in a combined signal.

At block 660, the combined signal can be communicated to a destination device, e.g., user equipment device 110 can receive a combined signal that uses OFDM to communicate CSI-RS and data block signals independently. At 665, the combined signal can be received and additional processing can render the first signal in the initial domain and the second signal.

A block 670, the combined signal can be demultiplexed to separate the signals into their orthogonal parts, resulting in the second signal, in one or more embodiments, being decoded and available for use. In one or more embodiments, to facilitate the use of the first signal (e.g., the CSI-RS received by user equipment device 110, an inverse of the transformation of block 620 can be performed, e.g., as depicted in FIG. 5, an inverse symplectic Fourier transform that can transform the first signal, demodulated in the time-frequency domain, back into the delay-Doppler domain.

It should be noted that, in some circumstances, the above approaches can have additional benefits beyond those discussed above. For example, when using the above approach to communicate a CSI-RS, because in some embodiments, the CSI-RS is initially generated in the delay-Doppler Domain, a receiver (e.g., user equipment device 110) can directly estimate the channel response in the delay-Doppler domain, with this domain being beneficially sparser.

In another feature, in some circumstances, because the transformation above transforms each RE in delay-Doppler domain to be spread across all the REs in a collapsed time-frequency domain, receiving devices can realize a processing gain as opposed to another approach, e.g., because the signal is available from more REs. It should further be noted that, in one or more embodiments, this processing gain for the receiver can be compared to the increase in processing and RS overhead required in some circumstances, by the transmitter of the signal, e.g., one or more approaches described herein can enable a flexible adjustment of the amount of overhead and processing gain by configuring different size of collapsed time-frequency domain, with a larger collapsed time-frequency domain requiring more RS overhead and processing at the transmitter, but reducing the processing required at the destination device.

Figure 7:
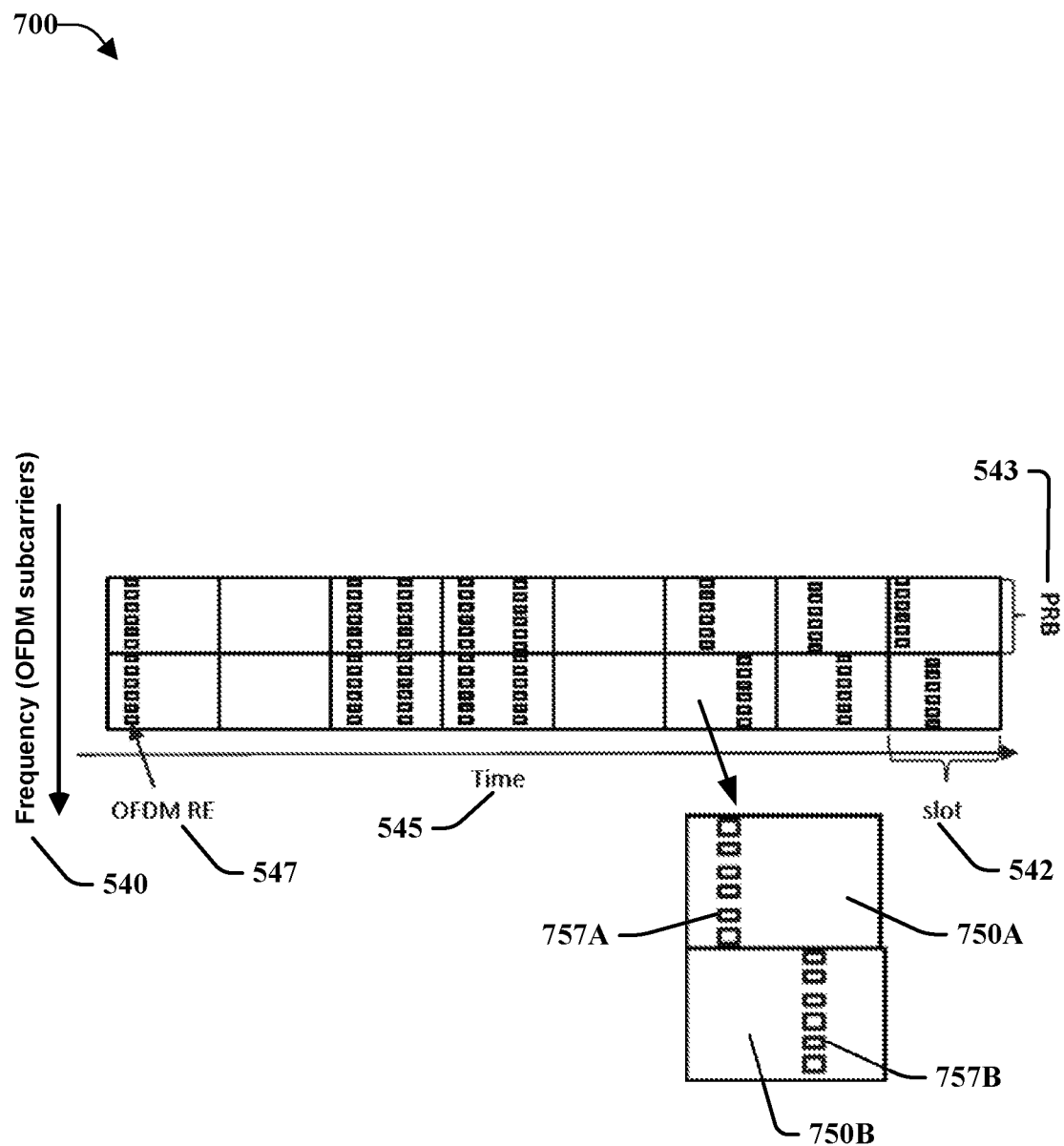
FIG. 7 illustrates a non-limiting, example of a collapsed time-frequency grid with irregular subsampling that can be used for transmission of signals, according to one or more embodiments.

FIG. 7 illustrates a non-limiting, example 700 of a collapsed time-frequency grid with irregular subsampling that can be used for transmission of signals, according to one or more embodiments. For purposes of brevity, description of like elements and/or processes employed in other embodiments is omitted.

As described with FIGS. 5-6 above, in one or more embodiments, the collapsed time-frequency grid can be a set of subsamples of an OFDM subcarrier and symbols from regular OFDM REs 747 following a subsampling pattern. As described above, the results of the symplectic Fourier transform can be mapped to the collapsed time-frequency grid. For transmission, the collapsed time-frequency grid can be multiplexed with data REs, following the subsampling pattern used to generate the collapsed time-frequency grid.

As another embodiment, as depicted in the PRB 743 of FIG. 7, the subsampling pattern to generate the collapsed time-frequency grid can be in irregular periodicity, e.g. the sampling rate on certain time or frequency can be higher than others. For example, in contrast to regular subsampling used to generate collapsed time-frequency grid 510, the portion of the collapsed time-frequency grid depicted in FIG. 7 was created by an irregular subsampling pattern, e.g., REs 757A-B are depicted in different portions of respective resource blocks 750A-B. Thus, it should be noted that, to further mitigate interference, the collapsed time-frequency domains used by one or more embodiments can be generated (e.g., by irregular subsampling) so as to avoid REs allocated to other signals, as well as for other reasons.

Figure 8:
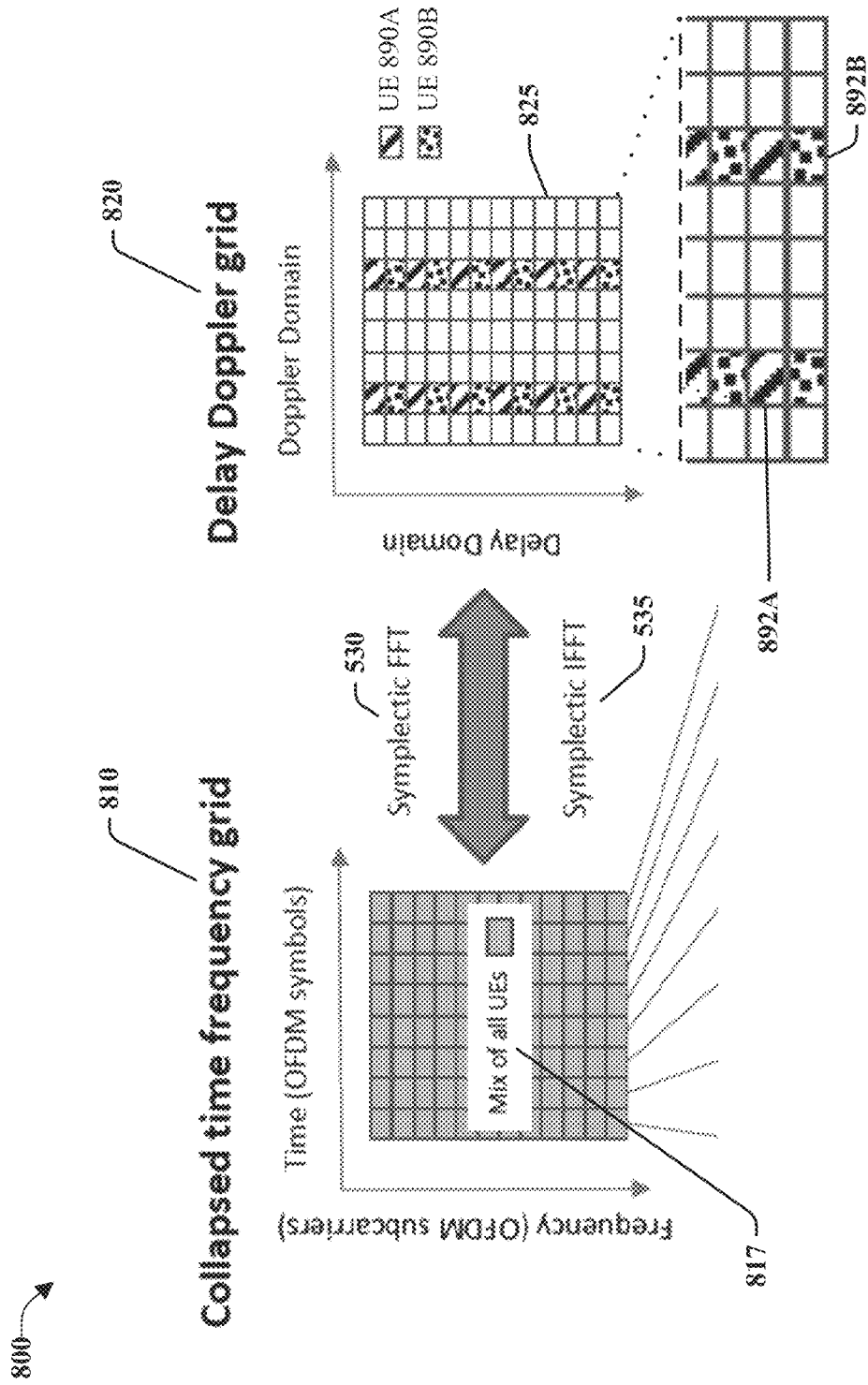
FIG. 8 illustrates a non-limiting, example of multiplexing transformed signals within a collapsed time-frequency grid, according to one or more embodiments.

FIG. 8 illustrates a non-limiting, example of multiplexing transformed signals within a collapsed time-frequency grid, according to one or more embodiments. For purposes of brevity, description of like elements and/or processes employed in other embodiments is omitted.

As described with FIG. 2 above, one of the reasons to implement different multiplexing approaches described herein is based on the need, in some circumstances to communicate potentially many CSI-RS signals, along with data and other signals while mitigating signal interference between the CSI-RS signals and the data and other signals. As described in FIGS. 5-7 above, approaches that can mitigate signal interference between CSI-RS signals and the data and other signals include one or more embodiments that can generate a CSI-RS signal in the delay-Doppler domain and employ a symplectic Fourier transform the CSI-RS signal into a signal in the time-frequency domain, orthogonally multiplexed with data or other signals, for transmission to a user equipment device.

Additional approaches are described with FIG. 8 that can improve the transmission of the potentially many CSI-RS signals to one or more user equipment devices. One or more of these approaches can orthogonally multiplex CSI-RS signals together in REs in the delay-Doppler domain. After being transformed into collapsed time-frequency domain for transmission and receipt (e.g., at block 620 described above), the orthogonally multiplexed CSI-RS signals are overlaid together in a collapsed time-frequency domain, e.g., time-frequency grid 810, having a mix of CSI-RS for multiple UEs. As described above, this collapsed time-frequency domain can be combined 625 with second signal 630, for transmission as a combined signal in block 660. It should be noted that FIG. 8 depicts CSI-RS signals for two user equipment devices, e.g., UEs 890A-B respectively being orthogonally multiplexed in the delay-Doppler grid 820 by REs 892A-B.

After the combined signal is received at block 660, and demultiplexed at block 670, the CSI-RS signals in the collapsed time-frequency domain can be transformed by a reverse Fourier transform at block 672. In one or more embodiments, this transformation can restore the CSI-RS signals orthogonally combined in the delay-Doppler domain, where they are separate and available for use.

In an alternative approach to improving the transmission of the potentially many CSI-RS signals to one or more user equipment devices, one or more embodiments can use a subsampling pattern to create multiple collapsed time-frequency domains within the portion of the time-frequency grid that is orthogonal to the portion used for second signal 630. In this approach, each CSI-RS can be on different collapsed time-frequency domain using an orthogonal subsampling pattern. At the final time-frequency domain used as the combined signal for transmission at block 660, each collapsed time-frequency domain can occupy different set of OFDM REs. In this approach, after the separation of block 670, the multiple collapsed time-frequency domains can be recovered based on the subsampling pattern, with these collapsed time-frequency domains being reverse transformed at block 670 back to respective CSI-RS signals in the delay-Doppler domain.

FIG. 9 illustrates an example formula that can be used with RE 420 discussed above, that is, transforming the RS created in another domain (e.g., delay-Doppler) into the time-frequency domain for transmission, in accordance with one or more embodiments. For purposes of brevity, description of like elements and/or processes employed in other embodiments is omitted.

As noted above, one approach that can be used by embodiments generates the RS in the delay-Doppler domain, then transforms it, using a symplectic Fourier transform into the time-frequency domain. The formula of FIG. 9 is an example of the second step. For example, label 910 is highlighting a representation of the RS in the time-frequency domain, e.g., RS (r') with time (n) and frequency (m). As a part of the function that can yield r'(n, m) 910, label 920 highlights a representation of RS in the delay- Doppler domain, RS (r) with an index in the delay bin (k) and an index in the doppler bin (1).

One having skill in the relevant arts, given the description herein, will recognize the other parts of the formula as a symplectic Fourier transform that can be tailored for the size of grid 530. For example, in the expression $N_{s,v}$ the (S, v) correspond to the size of the grid for which the spreading of the RS signal is targeted. Thus, because as noted above, a typical grid is 12 by 14, the values (S=12, v=14) can be used to tailor this formula to the typical grid size.

Figure 10:
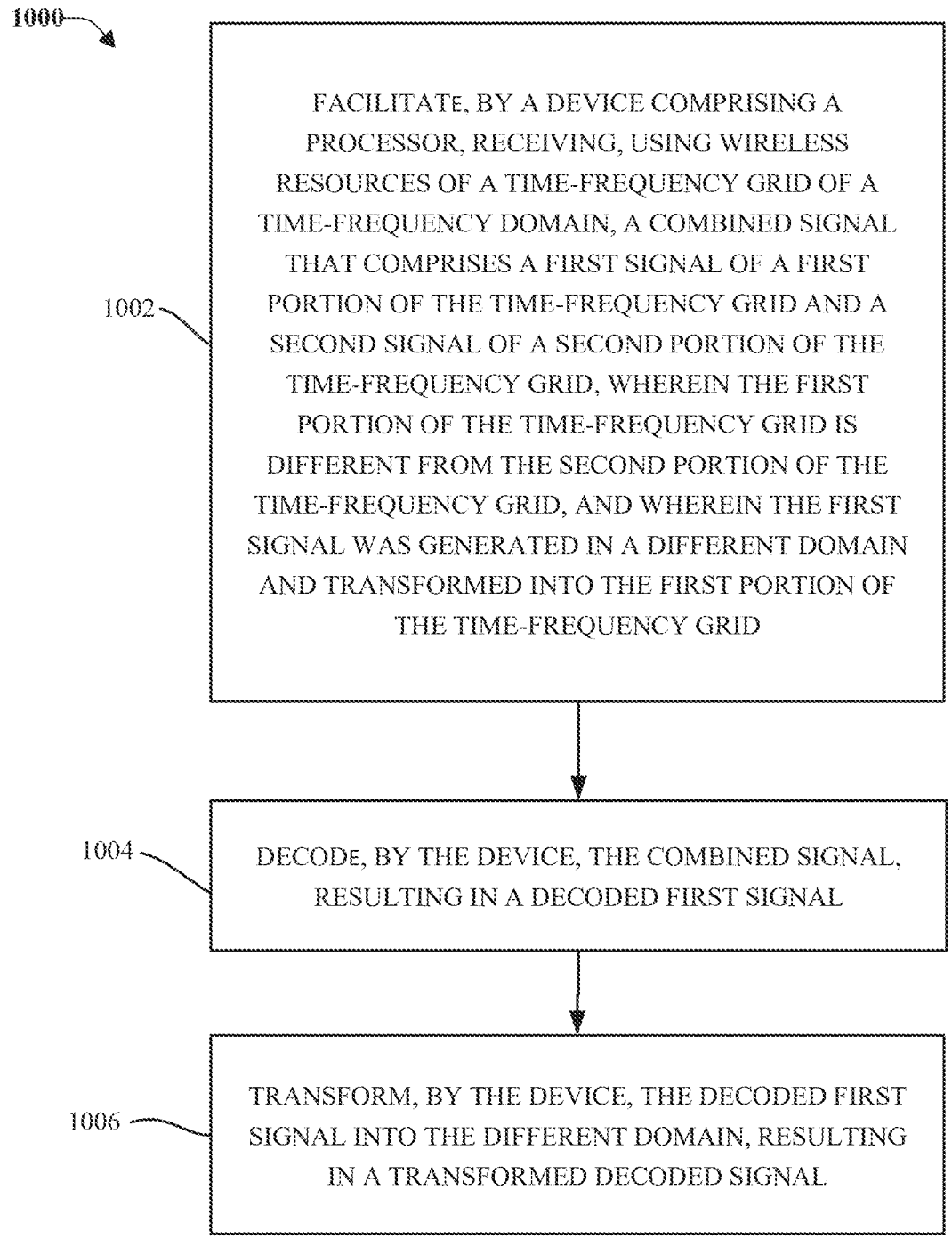
FIG. 10 illustrates a flow diagram of an example method that can facilitate transforming wireless reference signals into a different domain for transmission to user equipment, in accordance with one or more embodiments.

FIG. 10 illustrates a flow diagram of an example method 1000 that can facilitate transforming wireless reference signals generated in a delay-Doppler domain into a collapsed portion of a time-frequency domain for combination with other signals and transmission to user equipment, in accordance with one or more embodiments. For purposes of brevity, description of like elements and/or processes employed in other embodiments is omitted.

At 1002, method 1000 can facilitate, by a device comprising a processor 160, receiving, using wireless resources of a time-frequency grid of a time-frequency domain, a combined signal that comprises a first signal of a first portion of the time-frequency grid and a second signal of a second portion of the time-frequency grid, wherein the first portion of the time-frequency grid is different from the second portion of the time-frequency grid, and wherein the first signal was generated in a different domain and transformed into the first portion of the time-frequency grid. In an embodiment. In an example embodiment, method 1000 can facilitate, by a device (e.g., network device 150) comprising a processor 160, receiving, using wireless resources of a time-frequency grid 340 of a time-frequency domain, a combined signal that comprises a first signal of a first portion of the time-frequency grid (e.g., collapsed time-frequency grid 510) and a second signal 630 of a second portion of the time-frequency grid, wherein the first portion of the time-frequency grid is different from the second portion of the time-frequency grid, and wherein the first signal was generated in a different domain (e.g., the delay-Doppler domain) and transformed into the first portion of the time-frequency grid.

At 1004, method 1000 can decode, by the device, the combined signal, resulting in a decoded first signal. In an example embodiment, method 1000 can decode, by the device, the combined signal, resulting in a decoded first signal (e.g., separate signals block 670).

At 1006, method 1000 can transform, by the device, the decoded first signal into the different domain, resulting in a transformed decoded signal. In an example embodiment, method 1000 can transform (e.g., reverse Fourier transform 672), by the device, the decoded first signal into the different domain (e.g., the delay-Doppler domain), resulting in a transformed decoded signal.

Figure 11:
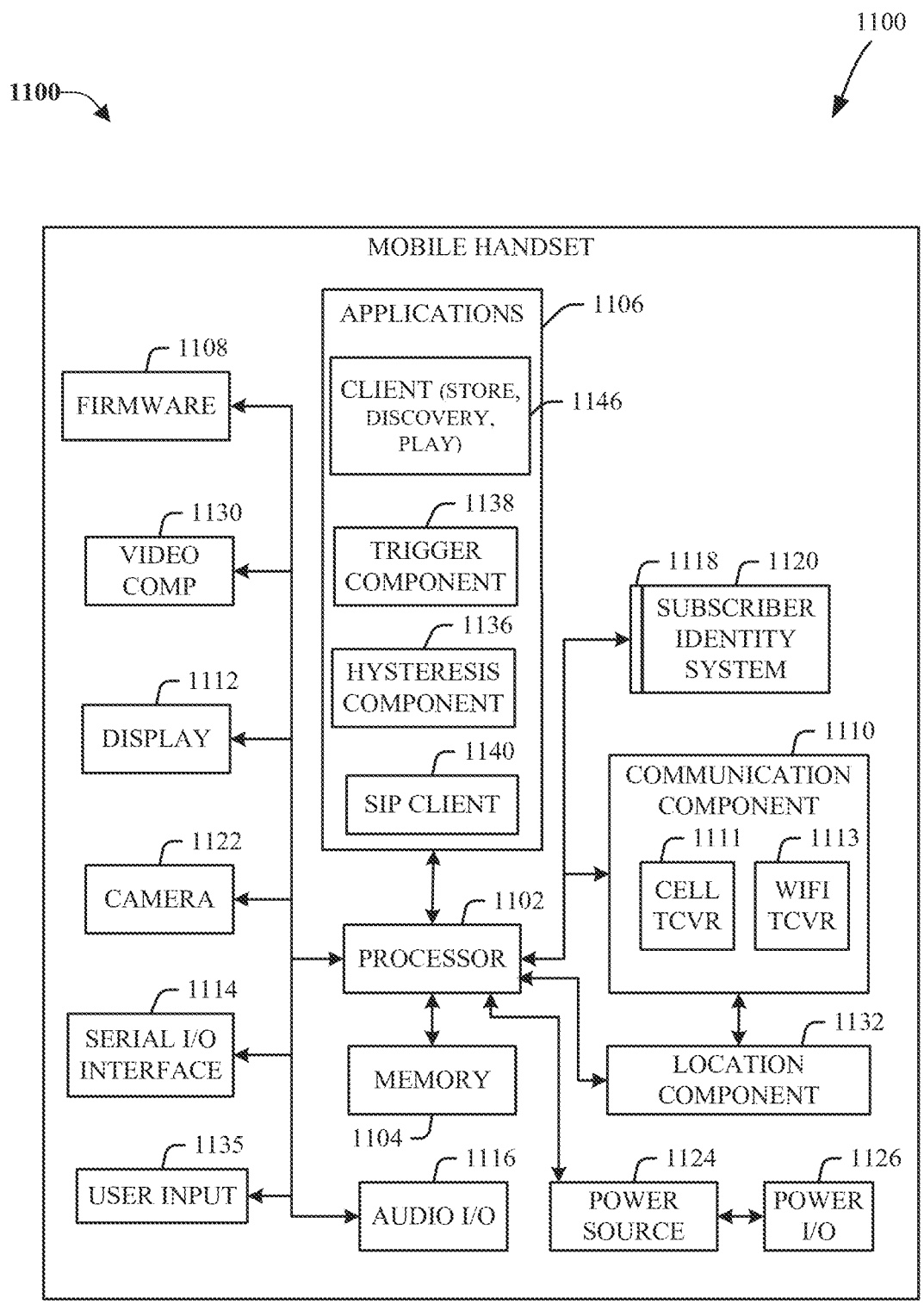
FIG. 11 illustrates an example block diagram of an example mobile handset operable to engage in a system architecture that can facilitate processes described herein, in accordance with one or more embodiments.

FIG. 11 illustrates a block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that some embodiments can also be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video content. A serial I/O interface 1114 is provided in communication with the processor 1102 to facilitate wired and/or wireless serial communications (e.g., USB, and/or IEEE 1294) through a hard-wire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video content. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video content. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video content. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 12:
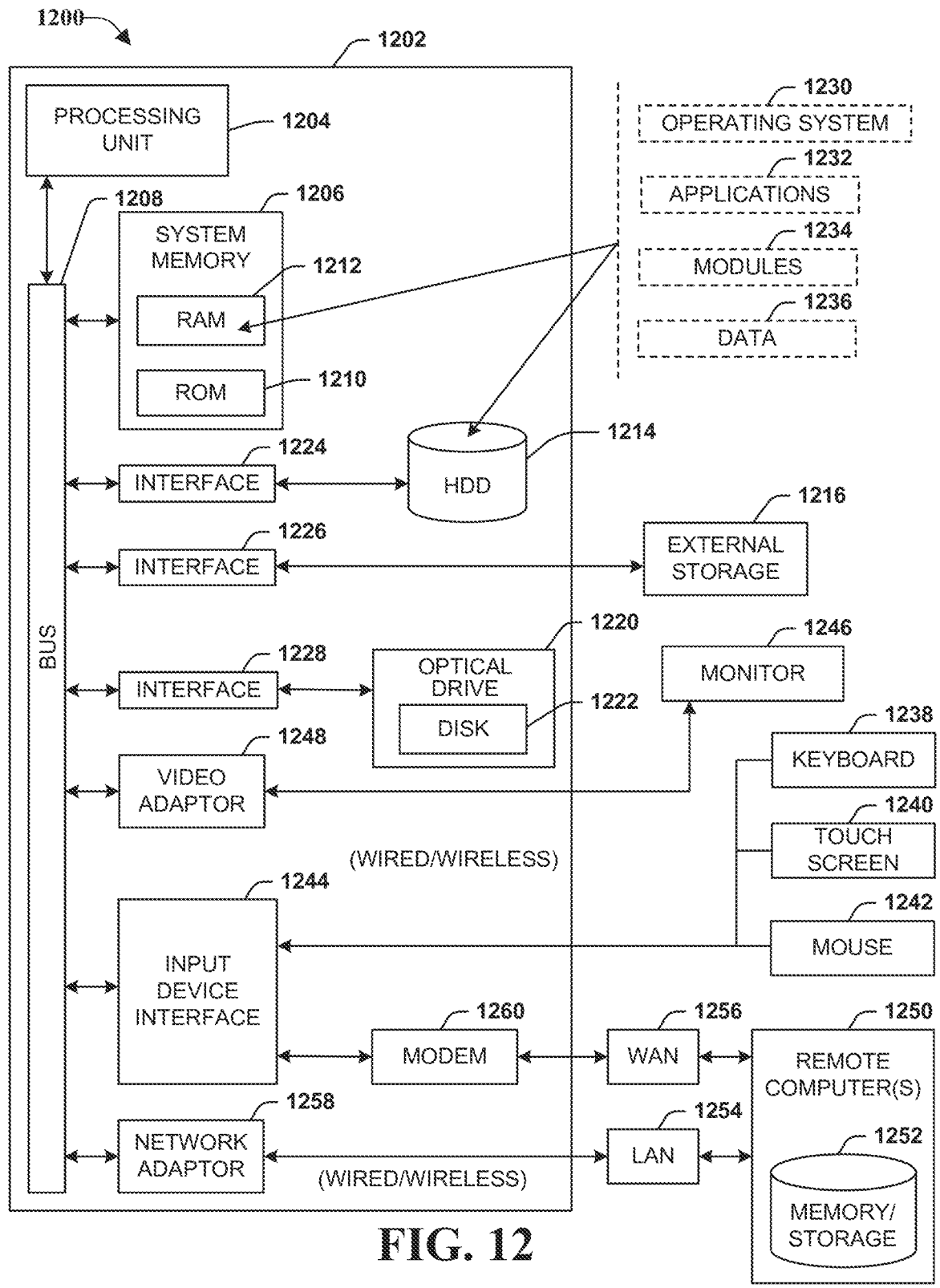
FIG. 12 illustrates an example block diagram of an example computer operable to engage in a system architecture that can facilitate processes described herein, in accordance with one or more embodiments.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor,
facilitate performance of operations, comprising:
generating a first signal in an initial domain;
transforming the first signal into a first portion of a time-frequency grid of a time-frequency domain, resulting in a transformed first signal;
combining the transformed first signal with a second signal of a second portion of the time-frequency grid, resulting in a combined signal, wherein the first portion of the time-frequency grid is different from the second portion of the time-frequency grid;
transmitting, using resources of the time-frequency grid, the combined signal to a user equipment device for a further transformation to be applied to the combined signal by the user equipment device, resulting in a transformed combined signal; and
in response to the transmitting of the combined signal, receiving a response signal from the user equipment device.

2. The system of claim 1, wherein the first portion of the time-frequency grid is orthogonal to the second portion of the time-frequency grid, and wherein the operation combining of the transformed first signal with the second signal comprises employing orthogonal frequency division multiplexing to combine the transformed first signal with the second signal.

3. The system of claim 1, wherein the transmitting of the combined signal to the user equipment device is further for a decoding of the combined signal by the user equipment device, resulting in a decoded second signal in the second portion of the time-frequency grid.

4. The system of claim 1, wherein the operations further comprise subsampling the first portion of the time-frequency grid, resulting in a subsampled portion, and wherein the transforming of the first signal into the first portion of the time-frequency grid comprises transforming the first signal into the subsampled portion.

5. The system of claim 4, wherein the subsampling of the first portion of the time-frequency grid comprises irregularly subsampling the first portion of the time-frequency grid.

6. The system of claim 1, wherein the transforming of the first signal comprises employing a Fourier transform to transform the first signal.

7. The system of claim 6, wherein the Fourier transform comprises a symplectic Fourier transform, and wherein the initial domain comprises a delay-Doppler domain.

8. The system of claim 1, wherein the receiving of the response signal from the user equipment device comprises receiving the response signal that was configured based on the further transformed first signal.

9. The system of claim 1, wherein the transforming of the first signal into the first portion of the time-frequency grid comprises spreading the transformed first signal across available resources of the first portion of the time-frequency grid shared with other devices.

10. A method, comprising:
facilitating, by a device comprising a processor, receiving, using wireless resources of a time-frequency grid of a time-frequency domain, a combined signal that comprises a first signal of a first portion of the time-frequency grid and a second signal of a second portion of the time-frequency grid, wherein the first portion of the time-frequency grid is different from the second portion of the time-frequency grid, and wherein the first signal was generated in a different domain and transformed into the first portion of the time-frequency grid;
decoding, by the device, the combined signal, resulting in a decoded first signal; and transforming, by the device, the decoded first signal into the different domain, resulting in a transformed decoded signal.

11. The method of claim 10, wherein the first portion of the time-frequency grid is orthogonal to the second portion of the time-frequency grid, and wherein the decoding of the combined signal comprises employing orthogonal frequency division demultiplexing to decode the combined signal.

12. The method of claim 10, wherein the first signal comprises a first reference signal and a second reference signal orthogonally combined in the different domain, wherein the decoded first signal comprises the first reference signal and the second reference signal spread across available resources of the first portion of the time-frequency grid, and wherein the transforming of the decoded first signal into the different domain, results a transformed first reference signal and a transformed second reference signal orthogonally combined in the different domain.

13. The method of claim 10, wherein the first signal comprises a first reference signal and a second reference signal combined in the different domain, wherein the decoded first signal comprises the first reference signal and the second reference signal respectively included in subsampled parts of the first portion of the time-frequency grid, and wherein the transforming of the decoded first signal into the different domain comprises respectively transforming the subsampled parts into the different domain, resulting in a transformed first reference signal and a transformed second reference signal in the different domain.

14. The method of claim 10, wherein the transforming of the decoded first signal comprises employing a symplectic Fourier transform to transform the decoded first signal.

15. The method of claim 10, wherein the different domain comprises a delay-Doppler domain.

16. The method of claim 10, wherein the first signal was transformed into the first portion of the time-frequency grid across available resources of the first portion of the time-frequency grid shared with other devices.

17. A non-transitory machine-readable medium, comprising executable instructions that, when executed by a processor of a device, facilitate performance of operations, comprising:
generating a reference signal in an initial domain;
transforming the reference signal into an orthogonal portion of an orthogonally multiplexed signal of a time-frequency domain;
transmitting the orthogonally multiplexed signal to a user equipment for a further transformation to be applied to the orthogonally multiplexed signal by the user equipment, resulting in a further transformed orthogonally multiplexed reference signal; and
in response to the transmitting of the orthogonally multiplexed signal, receiving a response signal from the user equipment that was configured, based on the further transformed orthogonally multiplexed reference signal.

18. The non-transitory machine-readable medium of claim 17, wherein the operation transforming of the reference signal comprises employing a Fourier transform to transform the reference signal.

19. The non-transitory machine-readable medium of claim 18, wherein the Fourier transform comprises a symplectic Fourier transform.

20. The non-transitory machine-readable medium of claim 17, wherein the initial domain comprises a delay-Doppler domain.

* * * * *